(12) United States Patent
Hu et al.

(10) Patent No.: US 11,611,291 B2
(45) Date of Patent: Mar. 21, 2023

(54) POWER SYSTEM AND PULSE WIDTH MODULATION METHOD THEREFOR

(71) Applicant: Delta Electronics, Inc., Taoyuan (TW)

(72) Inventors: Kai-Wei Hu, Taoyuan (TW); Mitradatta Misra, Taoyuan (TW); Ping-Heng Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 65 days.

(21) Appl. No.: 17/387,667

(22) Filed: Jul. 28, 2021

(65) Prior Publication Data

US 2022/0166344 A1 May 26, 2022

(30) Foreign Application Priority Data

Nov. 25, 2020 (CN) .......................... 202011336652.4

(51) Int. Cl.
*H02M 7/53* (2006.01)
*H02M 7/5395* (2006.01)
*H02M 1/38* (2007.01)
*H02M 1/08* (2006.01)

(52) U.S. Cl.
CPC .......... *H02M 7/5395* (2013.01); *H02M 1/08* (2013.01); *H02M 1/385* (2021.05)

(58) Field of Classification Search
CPC ....... H02M 7/5395; H02M 1/385; H02M 1/08
USPC ........................................................ 363/41
See application file for complete search history.

(56) References Cited

U.S. PATENT DOCUMENTS

| | | | | |
|---|---|---|---|---|
| 7,113,053 | B2* | 9/2006 | Yoshikawa | .............. H03K 7/08 |
| | | | | 332/110 |
| 8,531,251 | B2 | 9/2013 | Ludwig | |
| 9,178,409 | B2* | 11/2015 | Sakakibara | ......... H02M 5/4585 |
| 2002/0001203 | A1* | 1/2002 | Jitaru | .................. H02M 3/3376 |
| | | | | 363/17 |
| 2019/0109541 | A1* | 4/2019 | Takada | ................ H02M 3/1563 |
| 2019/0334457 | A1* | 10/2019 | Jeng | .................... H02M 7/5395 |

FOREIGN PATENT DOCUMENTS

| | | |
|---|---|---|
| CN | 108377092 B | 6/2020 |
| TW | 201041267 A | 11/2010 |
| TW | 201429135 A | 7/2014 |

(Continued)

*Primary Examiner* — Yemane Mehari
(74) *Attorney, Agent, or Firm* — Kirton McConkie; Evan R. Witt

(57) ABSTRACT

A power system includes a pulse width modulation device. The pulse width modulation device outputs first, second, third and fourth driving signals. The pulse width modulation device receives a control signal. The control signal is divided into a positive periodic signal and a negative periodic signal. A portion of the positive periodic signal higher than or equal to a maximum threshold voltage is clamped as the maximum threshold voltage to generate a first comparison waveform. The positive periodic signal is clamped as the reference voltage level to generate a second comparison waveform. According to the first comparison waveform, a first ramp signal is generated. According to the second comparison waveform, a first pulse width modulation signal is generated. The first, second, third and fourth driving signals are adjusted according to the first ramp signal and the first pulse width modulation signal.

18 Claims, 13 Drawing Sheets

(56) References Cited

FOREIGN PATENT DOCUMENTS

| | | | |
|---|---|---|---|
| TW | 201439707 | A | 10/2014 |
| TW | 201923504 | A | 6/2019 |
| TW | 201946357 | A | 12/2019 |
| TW | I711244 | B | 11/2020 |

* cited by examiner

POWER SYSTEM AND PULSE WIDTH MODULATION METHOD THEREFOR

FIELD OF THE INVENTION

The present disclosure relates to a power system, and more particularly to a power system and a pulse width modulation method for correcting the output voltage distortion due to the minimum pulse-width limit.

BACKGROUND OF THE INVENTION

In various industrial applications, power systems are usually used for voltage conversion. The power system includes a plurality of transistors. By alternately turning on or turning off the plurality of transistors, the power system converts a received voltage and supplies voltage to a load.

In addition, the power system includes a control unit and a pulse width modulation unit. The control unit outputs a control signal. According to the control signal, the output voltage from the power system is correspondingly adjusted. According to the control signal, the pulse width modulation unit generates a plurality of pulse width modulation signals. According to the plurality of pulse width modulation signals, the transistors are alternately turned on or turned off.

Each transistor of the power system usually includes a parasitic diode. The parasitic diode has the reverse recovery current characteristics. That is, the parasitic diode has a reverse current in a certain time period. Consequently, if the transistor is switched to the on state during the reverse recovery period, the reverse current on the parasitic diode is instantly cut off. The sudden current cutoff will cause a surge voltage on the circuit. The surge voltage may damage the electronic components of the power system. To avoid the above conditions, the switching actions of the transistors of the conventional power system need to meet the requirement of the minimum pulse-width limitation in order to ensure that the reverse recovery current on the parasitic diode of the transistor can become to zero within a switching period.

However, the minimum pulse-width limitation of the conventional power system still has some drawbacks. For example, in the time period corresponding to the minimum pulse-width limitation, the output voltage from the power system is clamped according to the minimum pulse-width limitation. Consequently, the output voltage is unable to be accurately adjusted according to the control signal from the control unit. In the time period corresponding to the minimum pulse-width limitation, the output energy from the power system is possibly suffered from distortion.

Therefore, there is a need of providing an improved power system and a pulse width modulation method for the power system.

SUMMARY OF THE INVENTION

An object of the present disclosure provides a power system and a pulse width modulation method for reducing the distortion of the output energy in the time period corresponding to the minimum pulse-width limitation of the conventional power system, wherein the output voltage of the conventional power system is unable to be accurately adjusted according to the control signal from the control unit in the time period corresponding to the minimum pulse-width limitation.

In accordance with an aspect of the present disclosure, a power system is provided. The power system includes a power conversion device and a pulse width modulation device. The pulse width modulation device outputs a first driving signal, a second driving signal, a third driving signal and a fourth driving signal to control the power conversion device. The pulse width modulation device includes a control unit and a pulse width modulation unit. The control unit generates a control signal. The control signal is a periodic signal. The pulse width modulation unit determines a critical time point of the control signal according to a reference voltage level, and divides the control signal into a positive periodic signal and a negative periodic signal according to the critical time point. The control signal at the critical time point is close to the reference voltage level within an error range. The pulse width modulation unit clamps a portion of the positive periodic signal that is higher than or equal to a maximum threshold voltage as the maximum threshold voltage so that a first comparison waveform is generated. The pulse width modulation unit clamps the positive periodic signal as the reference voltage level so that a second comparison waveform is generated. The pulse width modulation unit samples the first comparison waveform and the second comparison waveform in a first time interval between the critical time point and a first predetermined time point. A minimum threshold voltage and the first comparison waveform in the first time interval are superimposed by the pulse width modulation unit to generate a first ramp signal. The minimum threshold voltage and the second comparison waveform in the first time interval are superimposed by the pulse width modulation unit to generate a first pulse width modulation signal. In the first time interval, the first driving signal and the third driving signal are adjusted by the pulse width modulation unit according to a result of comparing the first ramp signal with a first triangular waveform, and the second driving signal and the fourth driving signal are adjusted by the pulse width modulation unit according to a result of comparing the first pulse width modulation signal with a second triangular waveform. A phase difference between the first triangular waveform and the second triangular waveform is 180 degrees.

In accordance with another aspect of the present disclosure, a pulse width modulation method for a pulse width modulation device of a power system is provided. The pulse width modulation device outputs a first driving signal, a second driving signal, a third driving signal and a fourth driving signal to control a power conversion device of the power system. The pulse width modulation method includes the following steps. Firstly, a control signal is received, wherein the control signal is a periodic signal. Then, a critical time point of the control signal is determined according to a reference voltage level. The control signal is divided into a positive periodic signal and a negative periodic signal according to the critical time point. The control signal at the critical time point is close to the reference voltage level within an error range. A portion of the positive periodic signal that is higher than or equal to a maximum threshold voltage is clamped as the maximum threshold voltage, so that a first comparison waveform is generated. The positive periodic signal is clamped as the reference voltage level, so that a second comparison waveform is generated. The first comparison waveform and the second comparison waveform in a first time interval between the critical time point and a first predetermined time point are sampled. A minimum threshold voltage and the first comparison waveform in the first time interval are superimposed, so that a first ramp signal is generated. The minimum threshold voltage and the second comparison waveform in the first time interval are superimposed, so that a first pulse width modulation signal is generated. The first driving signal and the third driving signal in the first time interval are adjusted according to a result of comparing the first ramp signal with a first triangular waveform. The second driving signal and the fourth driving signal in the first time interval are adjusted according to a result of comparing the first pulse width modulation signal with a second triangular waveform. A phase difference between the first triangular waveform and the second triangular waveform is 180 degrees.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
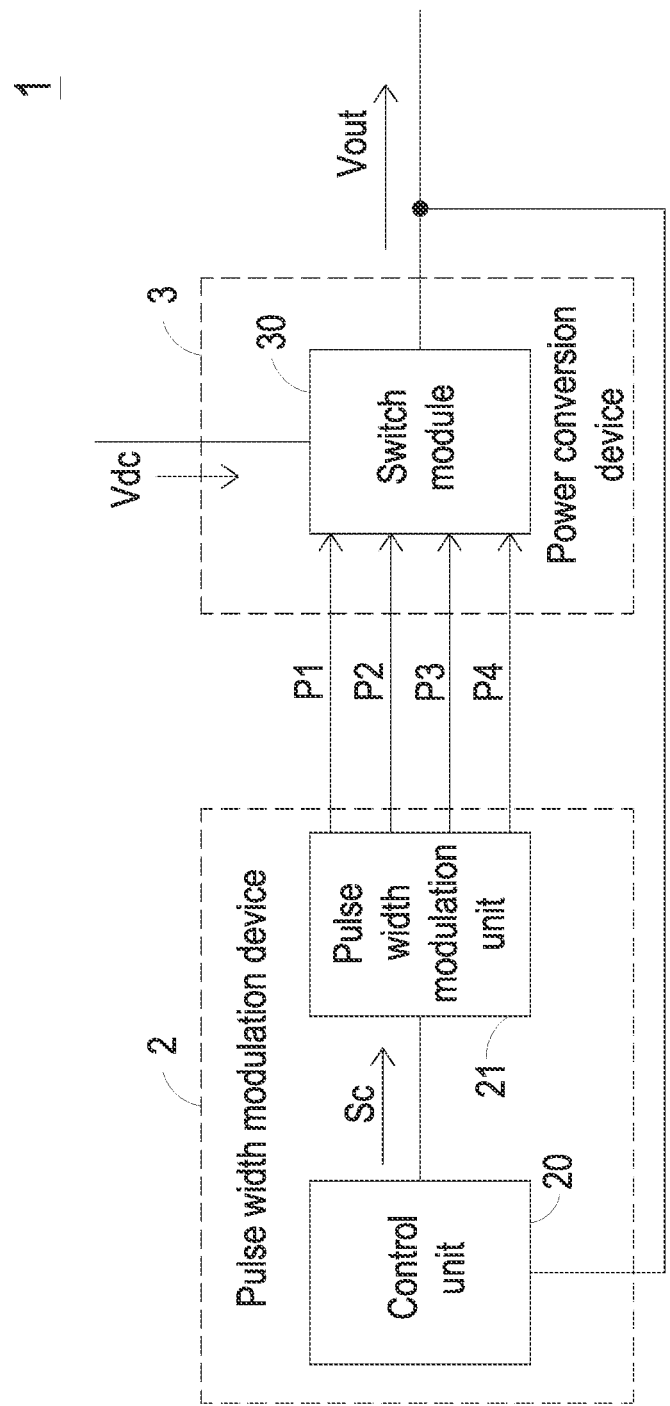
FIG. 1A is a schematic circuit block diagram illustrating a power system according to an embodiment of the present disclosure.
Figure 1C:
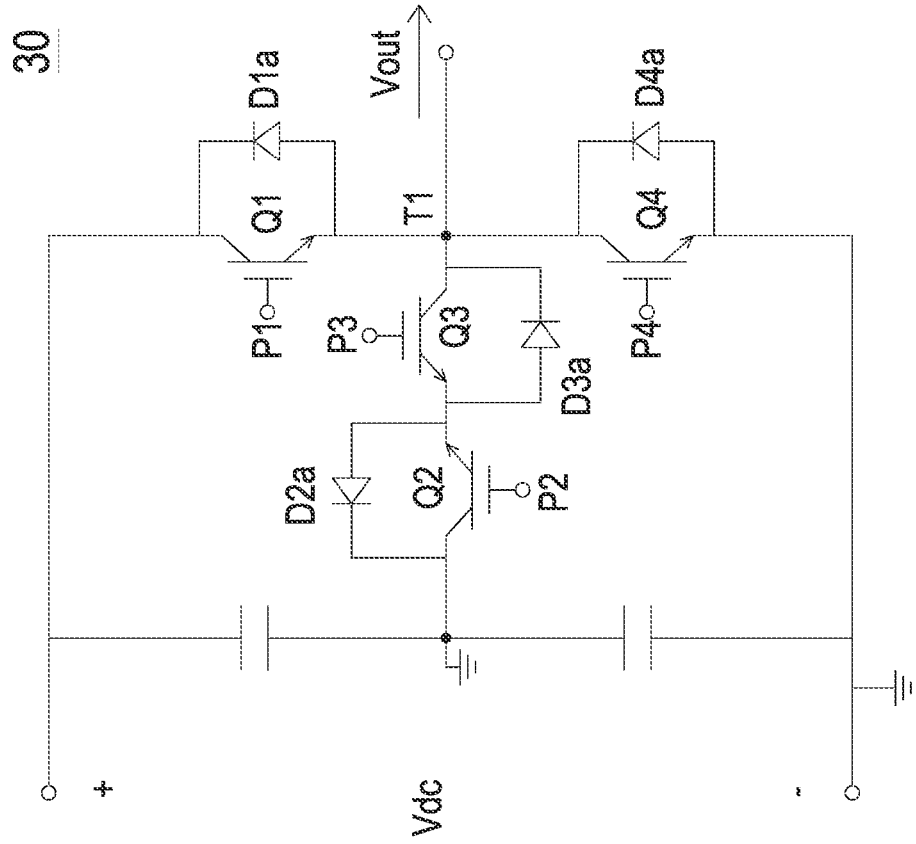
FIG. 1C is a schematic circuit diagram illustrating a second example of the power conversion device used in the power system as shown in FIG. 1A.
Figure 1B:
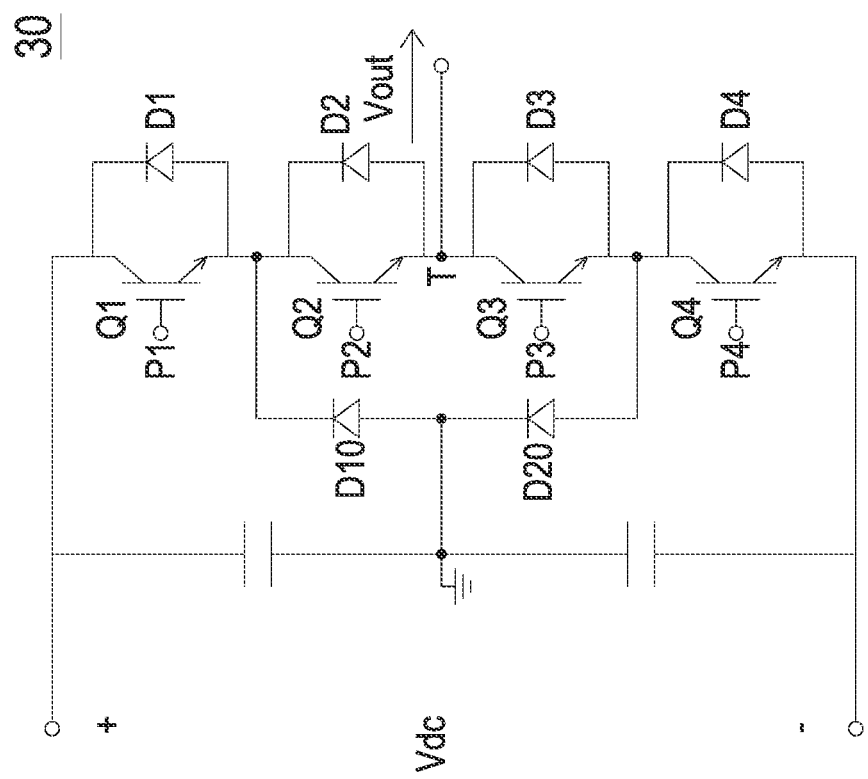
FIG. 1B is a schematic circuit diagram illustrating a first example of the power conversion device used in the power system as shown in FIG. 1A.
Figure 2:
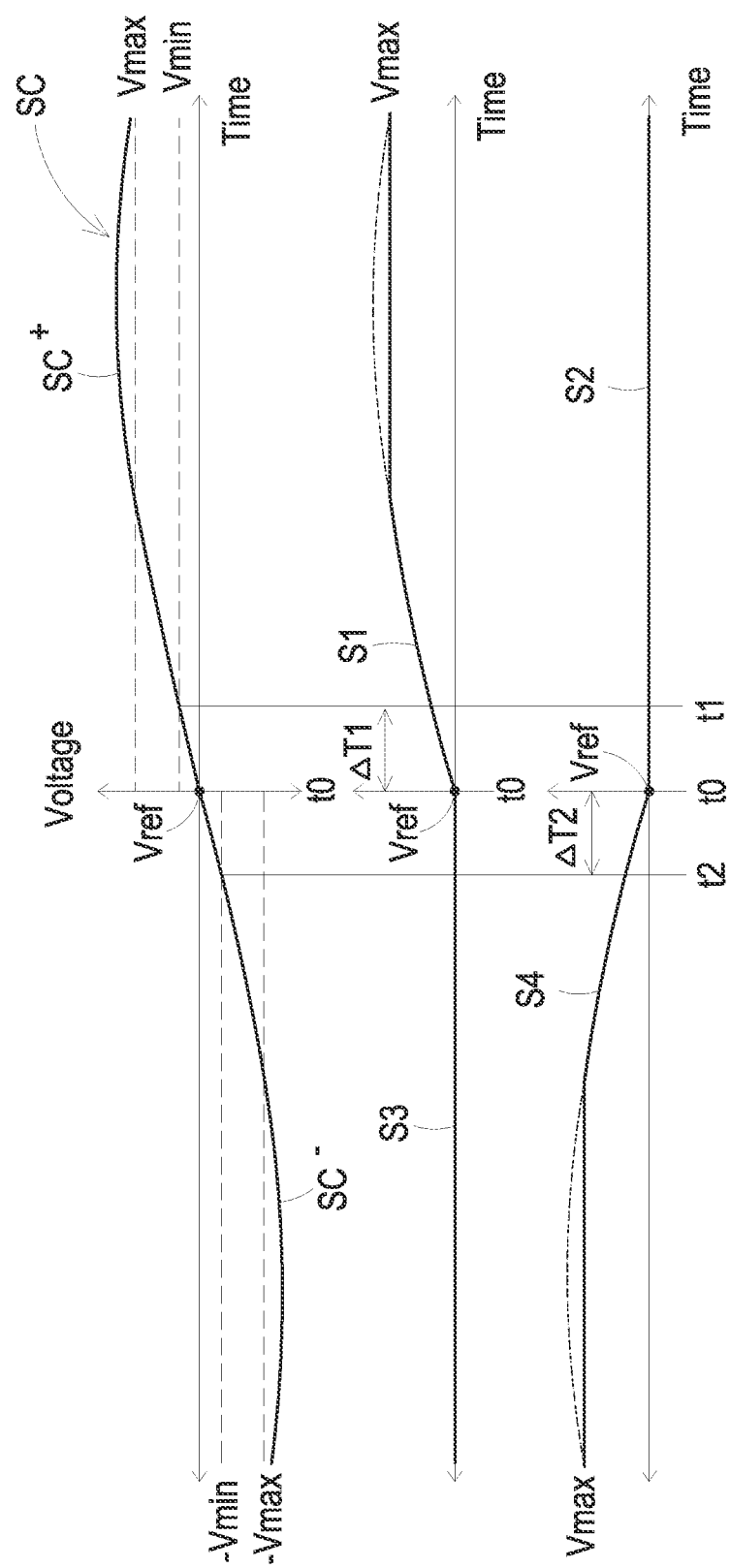
FIG. 2 is a schematic timing waveform diagram illustrating associated signal during the operation of a pulse width modulation unit of the power system as shown in FIG. 1A.
Figure 3A:
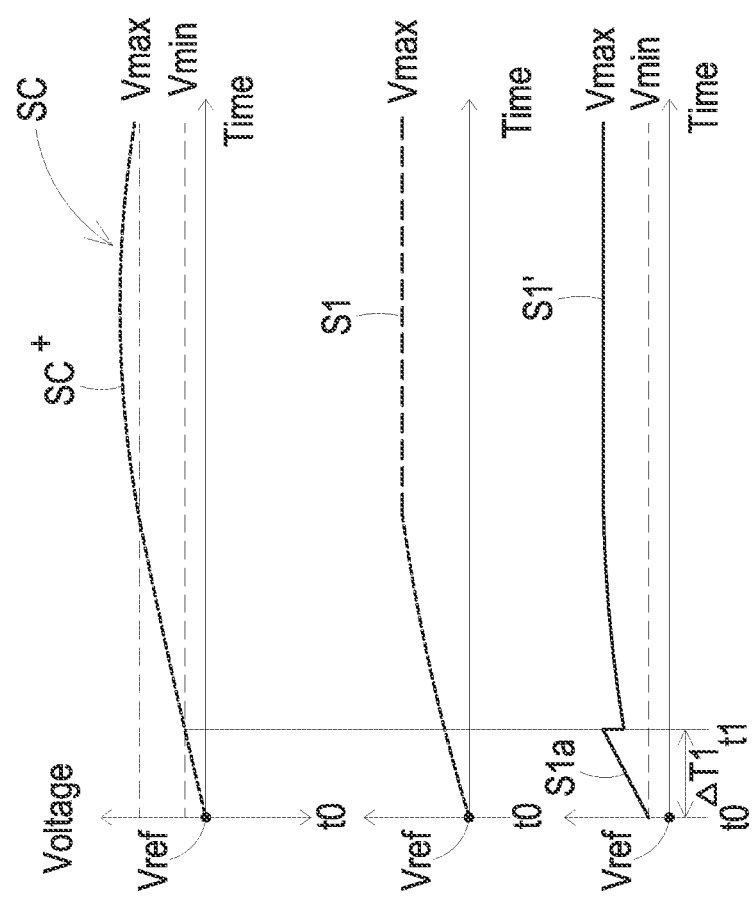
FIG. 3A is a schematic timing waveform diagram illustrating a first ramp signal S1$a$ and a first reference signal S1' generated by the pulse width modulation unit.
Figure 3B:
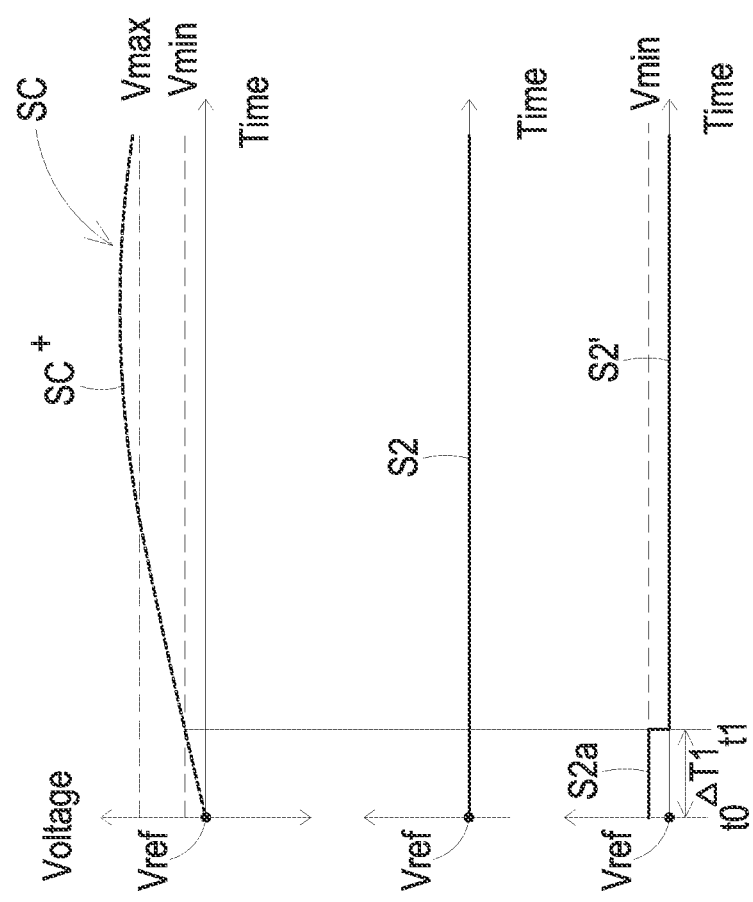
FIG. 3B is a schematic timing waveform diagram illustrating the relationship between a first PWM signal S2$a$ and a second reference signal S2' generated by the pulse width modulation unit.
Figure 4A:
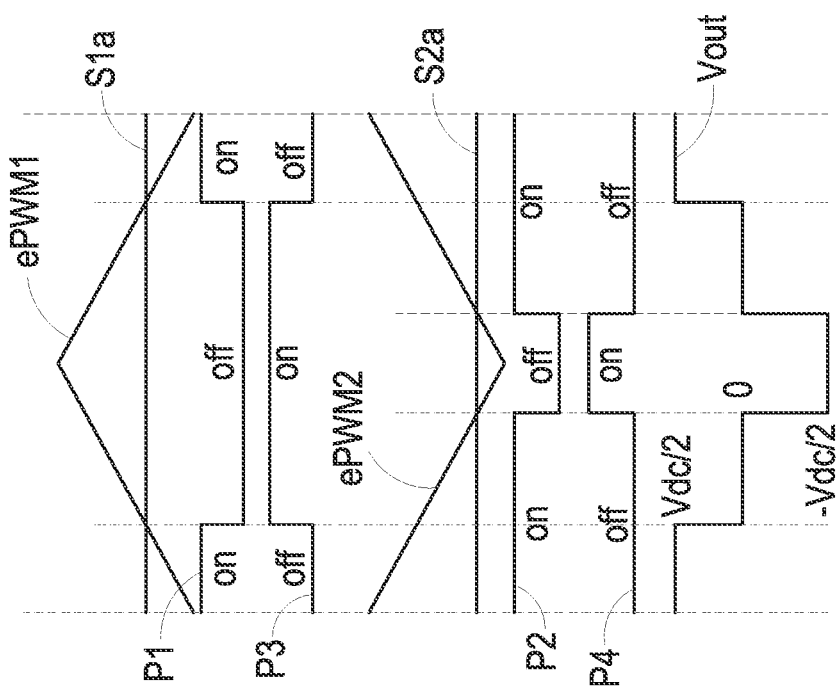
FIG. 4A is a schematic timing waveform diagram illustrating the relationship between a first triangular waveform ePWM1, a second triangular waveform ePWM2, the first ramp signal S1$a$, the first PWM signal S2$a$, the first driving signal P1, the second driving signal P2, the third driving signal P3 and the fourth driving signal P4 in a first time interval.
Figure 4B:
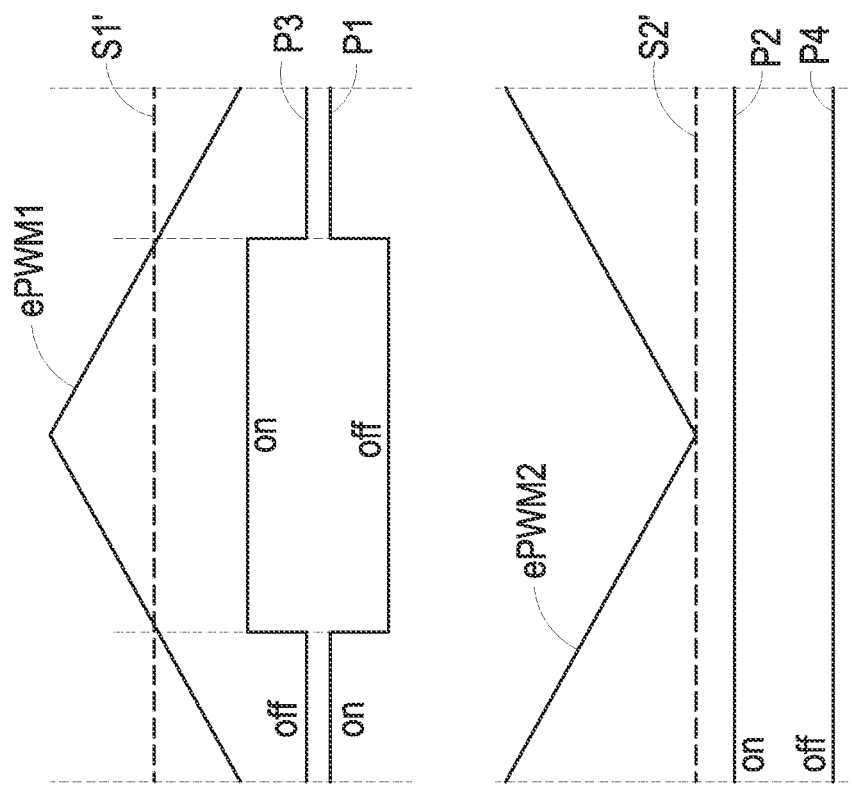
FIG. 4B is a schematic timing waveform diagram illustrating the relationship between the first triangular waveform ePWM1, the second triangular waveform ePWM2, the first reference waveform S1', the second reference waveform S2', the first driving signal P1, the second driving signal P2, the third driving signal P3 and the fourth driving signal P4 in the first time interval.

Please refer to FIGS. 1A, 1B, 1C, 2, 3A, 3B, 4A and 4B. FIG. 1A is a schematic circuit block diagram illustrating a power system 1 according to an embodiment of the present disclosure. FIG. 1B is a schematic circuit diagram illustrating a first example of the power conversion device 3 used in the power system 1 as shown in FIG. 1A. FIG. 1C is a schematic circuit diagram illustrating a second example of the power conversion device 3 used in the power system 1 as shown in FIG. 1A. FIG. 2 is a schematic timing waveform diagram illustrating associated signal during the operation of a pulse width modulation unit 21 of the power system 1 as shown in FIG. 1A. FIG. 3A is a schematic timing waveform diagram illustrating a first ramp signal S1$a$ and a first reference signal S1' generated by the pulse width modulation unit 21. FIG. 3B is a schematic timing waveform diagram illustrating the relationship between a first pulse width modulation (PWM) signal S2$a$) and a second reference signal S2' generated by the pulse width modulation unit 21. FIG. 4A is a schematic timing waveform diagram illustrating the relationship between a first triangular waveform ePWM1, a second triangular waveform ePWM2, the first ramp signal Sla, the first PWM signal S2$a$, the first driving signal P1, the second driving signal P2, the third driving signal P3 and the fourth driving signal P4 in a first time interval ΔT1. FIG. 4B is a schematic timing waveform diagram illustrating the relationship between the first triangular waveform ePWM1, the second triangular waveform ePWM2, the first reference waveform S1', the second reference waveform S2', the first driving signal P1, the second driving signal P2, the third driving signal P3 and the fourth driving signal P4 in the first time interval ΔT1.

Please refer to FIGS. 1A to 1C, FIG. 2, FIGS. 3A to 3B and FIGS. 4A to 4B. The power system 1 is configured to receive an input voltage (e.g., a DC voltage from a battery, a solar power panel or a capacitor) and convert the input voltage into an AC output voltage Vout. The AC output voltage Vout is provided to an AC load, such as a motor, a power grid or an industrial product. Preferably but not exclusively, the output voltage Vout is a three-phase output voltage.

In an embodiment, the power system 1 includes a pulse width modulation device 2 and a power conversion device 3. The pulse width modulation device 2 outputs a first driving signal P1, a second driving signal P2, a third driving signal P3 and a fourth driving signal P4 to operate the power conversion device 3. The power conversion device 3 includes a switch module 30. The switch module 30 includes a plurality of transistors. For example, as shown in FIG. 1B, the switch module 30 includes four transitions Q1 to Q4. The power conversion device 3 receives the input voltage. The four transitions Q1 to Q4 of the switch module 30 are controlled according to the first driving signal P1, the second driving signal P2, the third driving signal P3 and the fourth driving signal P. When the four transitions Q1 to Q4 are alternately turned on or turned off according to the driving signals P1, P2, P3 and P4, the input voltage is converted into the output voltage Vout. That is, the switch module 30 is alternately turned on or turned off according to the driving signals P1, P2, P3 and P4, so that the DC input voltage is converted into the AC output voltage by the switch module 30. In this embodiment, the input voltage is a DC voltage generated by the DC voltage source Vdc, and the output voltage is the AC voltage. However, the present invention is not limited thereto.

In some embodiments, as shown in FIG. 1B, the switch module 30 is an I-type three-level switch module. The switch module 30 includes the first transistor Q1, the second transistor Q2, the third transistor Q3 and the fourth transistor Q4. The first transistor Q1 includes a control terminal, a first terminal and a second terminal. The control terminal of the first transistor Q1 is coupled to the first driving signal P1. The first terminal of the first transistor Q1 is coupled to the positive terminal of the DC voltage source Vdc. The second transistor Q2 includes a control terminal, a first terminal and a second terminal. The control terminal of the second transistor Q2 is coupled to the second driving signal P2. The first terminal of the second transistor Q2 is coupled to the second terminal of the first transistor Q1. The third transistor Q3 includes a control terminal, a first terminal and a second terminal. The control terminal of the third transistor Q3 is coupled to the third driving signal P3. The first terminal of the third transistor Q3 is coupled to the second terminal of the second transistor Q2 for forming an output node T. The output voltage Vout is outputted from the power conversion device 3 through the output node T. The fourth transistor Q4 includes a control terminal, a first terminal and a second terminal. The control terminal of the fourth transistor Q4 is coupled to the fourth driving signal P4. The first terminal of the fourth transistor Q4 is coupled to the second terminal of the third transistor Q3. The second terminal of the fourth transistor Q4 is coupled to the ground terminal of the DC voltage source Vdc. When the power conversion device 3 receives the input voltage, the input voltage is converted into the DC voltage source Vdc for the switch module 30. Alternatively, the DC voltage source Vdc directly provides the input voltage, but it is not limited thereto.

In an embodiment, the first transistor Q1, the second transistor Q2, the third transistor Q3 and the fourth transistor Q4 are metal-oxide-semiconductor field-effect transistors (MOSFET) or bipolar junction transistors (BJT). For example, the transistors from the first transistor Q1 to the fourth transistor Q4 are high-voltage turn-on semiconductor devices (e.g., N-type MOSFET transistors or NPN-type BJT transistors) or low-voltage turn-on semiconductor devices (e.g., P-type MOSFET transistors or PNP-type BJT transistors). For illustration, the transistors from the first transistor Q1 to the fourth transistor Q4 in the following embodiments are N-type MOSFET transistors, but the present invention is not limited thereto. In each of the transistors from the first transistor Q1 to the fourth transistor Q4, the first terminal is the drain terminal, the second terminal is the source terminal, and the control terminal is the gate terminal.

In addition, the first to fourth transistors Q1-Q4 include parasitic diodes D1, D2, D3 and D4, respectively. The anode terminal of the parasitic diode D1 is electrically connected with the second terminal of the first transistor Q1. The cathode terminal of the parasitic diode D1 is electrically connected with the first terminal of the first transistor Q1. The anode terminal of the parasitic diode D2 is electrically connected with the second terminal of the second transistor Q2. The cathode terminal of the parasitic diode D2 is electrically connected with the first terminal of the second transistor Q2. The anode terminal of the parasitic diode D3 is electrically connected with the second terminal of the third transistor Q3. The cathode terminal of the parasitic diode D3 is electrically connected with the first terminal of the third transistor Q3. The anode terminal of the parasitic diode D4 is electrically connected with the second terminal of the fourth transistor Q4. The cathode terminal of the parasitic diode D4 is electrically connected with the first terminal of the fourth transistor Q4. The switch module 30 further includes a first diode D10 and a second diode D20. The cathode terminal of the first diode D10 is electrically connected with the second terminal of the first transistor Q1 and the first terminal of the second transistor Q2. The anode terminal of the first diode D10 is electrically connected with the cathode terminal of the second diode D20. The anode terminal of the second diode D20 is electrically connected with the second terminal of the third transistor Q3 and the first terminal of the fourth transistor Q4.

In some other embodiments, as shown in FIG. 1C, the switch module 30 is a T-type three-level switch module. The switch module 30 includes the first transistor Q1, the second transistor Q2, the third transistor Q3 and the fourth transistor Q4. The first transistor Q1 includes a control terminal, a first terminal and a second terminal. The control terminal of the first transistor Q1 is coupled to the first driving signal P1. The first terminal of the first transistor Q1 is coupled to the positive terminal of the DC voltage source Vdc. The second transistor Q2 includes a control terminal, a first terminal and a second terminal. The control terminal of the second transistor Q2 is coupled to the second driving signal P2. The first terminal of the second transistor Q2 is coupled to the DC voltage source Vdc. The third transistor Q3 includes a control terminal, a first terminal and a second terminal. The control terminal of the third transistor Q3 is coupled to the third driving signal P3. The second terminal of the third transistor Q3 is coupled to the second terminal of the second transistor Q2. The fourth transistor Q4 includes a control terminal, a first terminal and a second terminal. The control terminal of the fourth transistor Q4 is coupled to the fourth driving signal P4. The first terminal of the fourth transistor Q4, the first terminal of the third transistor Q3 and the second terminal of the first transistor Q1 are commonly coupled to each other for forming an output node T1. The output voltage Vout is outputted from the power conversion device 3 through the output node T1. The second terminal of the fourth transistor Q4 is coupled to the ground terminal of the DC voltage source Vdc.

The first transistor Q1 to the fourth transistor Q4 include parasitic diodes D1a, D2a, D3a and D4a, respectively. The anode terminal of the parasitic diode D1a is electrically connected with the second terminal of the first transistor Q1. The cathode terminal of the parasitic diode D1a is electrically connected with the first terminal of the first transistor Q1. The anode terminal of the parasitic diode D2a is electrically connected with the second terminal of the second transistor Q2. The cathode terminal of the parasitic diode D2 is coupled to the DC voltage source Vdc. The anode terminal of the parasitic diode D3a is electrically connected with the second terminal of the third transistor Q3. The cathode terminal of the parasitic diode D3a is electrically connected with the first terminal of the third transistor Q3. The anode terminal of the parasitic diode D4 is electrically connected with the second terminal of the fourth transistor Q4. The cathode terminal of the parasitic diode D4 is electrically connected with the first terminal of the fourth transistor Q4.

The operations of the switch module 30 as shown in FIG. 1C are similar to the operations of the switch module 30 as shown in FIG. 1B. For succinctness, only the operations of the switch module 30 as shown in FIG. 1B will be described as follows.

The pulse width modulation device 2 outputs the first driving signal P1, the second driving signal P2, the third driving signal P3 and the fourth driving signal P4 to the first transistor Q1, the second transistor Q2, the third transistor Q3 and the fourth transistor Q4, respectively. The first transistor Q1, the second transistor Q2, the third transistor Q3 and the fourth transistor Q4 are alternately turned on or turned off according to the first driving signal P1, the second driving signal P2, the third driving signal P3 and the fourth driving signal P4. In an embodiment, the waveforms of the first driving signal P1 and the third driving signal P3 are complementary to each other, and the waveforms of the second driving signal P2 and the fourth driving signal P4 are complementary to each other. In other words, the on/off states of the first transistor Q1 and the on/off states of the third transistor Q3 are complementary to each other, and the on/off states of the second transistor Q2 and the on/off states of the fourth transistor Q4 are complementary to each other.

The pulse width modulation device 2 includes a control unit 20 and a pulse width modulation unit 21. The control unit 20 generates a control signal Sc to the pulse width modulation unit 21. According to the control signal Sc, the pulse width modulation unit 21 controls the switch module 30 of the power conversion device 3. Preferably but not exclusively, the control signal Sc is a periodic signal. In an embodiment, the control unit 20 further samples the output voltage Vout and the output current of the power conversion device 3 by using a voltage sampling element or a current sampling element. According to the sampling results, the control signal Sc is correspondingly adjusted by the control unit 20.

According to a reference voltage level Vref (e.g., a zero voltage level as shown in FIG. 2), the pulse width modulation unit 21 determines a critical time point of the control signal Sc. According to the critical time point, the control signal Sc is divided into a positive periodic signal Sc+ in a positive half cycle and a negative periodic signal Sc− in a negative half cycle. As shown in FIG. 2, the critical time point is determined according to the zero voltage level. The critical time point of the control signal Sc is t0. The control signal Sc is divided into the positive periodic signal Sc+ after t0 and a negative periodic signal Sc− before t0. The control signal Sc at the critical time point t0 is close to the reference voltage level Vref within an error range.

The operations of the control signal Sc in the positive half cycle will be described as follows.

Please refer to FIG. 2 again. The pulse width modulation unit 21 clamps the portion of the positive periodic signal Sc+ that is higher than or equal to a maximum threshold voltage Vmax as the maximum threshold voltage Vmax, so that a first comparison waveform S1 is generated. The pulse width modulation unit 21 clamps the positive periodic signal Sc+ as the reference voltage level Vref, so that a second comparison waveform S2 is generated. Then, the pulse width modulation unit 21 samples the portions of the first comparison waveform S1 and the second comparison waveform S2 in a first time interval ΔT1 between the critical time point t0 and a first predetermined time point t1. The minimum threshold voltage Vmin and the portion of the first comparison waveform S1 in the first time interval ΔT1 are superimposed by the pulse width modulation unit 21 to generate a first ramp signal S1a (see FIG. 3A). The minimum threshold voltage Vmin and the portion of the second comparison waveform S2 in the first time interval ΔT1 are superimposed by the pulse width modulation unit 21 to generate a first pulse width modulation signal S2a (see FIG. 3B).

Please refer to FIG. 4A again. In the first time interval ΔT1, the first driving signal P1 and the third driving signal P3 are adjusted by the pulse width modulation unit 21 according to the result of comparing the first ramp signal S1a with a first triangular waveform ePWM1, and the second driving signal P2 and the fourth driving signal P4 are adjusted by the pulse width modulation unit 21 according to the result of comparing the first pulse width modulation signal S2a with a second triangular waveform ePWM2. The phase difference between the first triangular waveform ePWM1 and the second triangular waveform ePWM2 is 180 degrees.

The first time interval ΔT1 is a time interval in the positive half cycle of the control signal Sc corresponding to the minimum pulse-width limitation of the power system 1. The minimum threshold voltage Vmin is a preset value of the output voltage Vout corresponding to the minimum pulse-width limitation of the power system 1.

Please refer to FIG. 4A again. When the pulse width modulation unit 21 determines that the first ramp signal S1a is higher than the first triangular waveform ePWM1 in the first time interval ΔT1, the pulse width modulation unit 21 switches the first driving signal P1 to the high level state and switches the third driving signal P3 to the low level state. Consequently, the first transistor Q1 is turned on, and the third transistor Q3 is turned off. In addition, when the pulse width modulation unit 21 determines that the first pulse width modulation signal S2a is lower than the second triangular waveform ePWM2 in the first time interval ΔT1, the pulse width modulation unit 21 switches the second driving signal P2 to the high level state and switches the fourth driving signal P4 to the low level state. Consequently, the second transistor Q2 is turned on, and the fourth transistor Q4 is turned off.

Additionally, when the pulse width modulation unit 21 determines that the first ramp signal S1a is lower than or equal to the first triangular waveform ePWM1 in the first time interval ΔT1, the pulse width modulation unit 21 switches the first driving signal P1 to the low level state and switches the third driving signal P3 to the high level state. Consequently, the first transistor Q1 is turned off, and the third transistor Q3 is turned on. When the pulse width modulation unit 21 determines that the first pulse width modulation signal S2a is higher than or equal to the second triangular waveform ePWM2 in the first time interval ΔT1, the pulse width modulation unit 21 switches the second driving signal P2 to the low level state and switches the fourth driving signal P4 to the high level state. Consequently, the second transistor Q2 is turned off, and the fourth transistor Q4 is turned on.

As shown in FIG. 4A, the output voltage Vout has three levels, which are 0, −Vdc/2 and Vdc/2, in the positive half cycle of the control signal Sc.

As mentioned above, the first ramp signal S1a is generated after the minimum threshold voltage Vmin and the portion of the first comparison waveform S1 in the first time interval ΔT1 are superimposed by the pulse width modulation unit 21, and the first pulse width modulation signal S2a is generated after the minimum threshold voltage Vmin and the portion of the second comparison waveform S2 in the first time interval ΔT1 are superimposed by the pulse width modulation unit 21. In other words, the minimum threshold voltage Vmin is compensated to the control signal Sc in the time interval of the positive half cycle of the control signal Sc corresponding to the minimum pulse-width limitation of the power system 1. Consequently, the power system 1 can meet the requirements of the minimum pulse-width limitation. As mentioned above, the first ramp signal S1a is generated after the minimum threshold voltage Vmin and the positive periodic signal of the control signal in the first time interval ΔT1 are superimposed. Since the minimum threshold voltage Vmin of the first ramp signal S1a and the minimum threshold voltage Vmin of the first pulse width modulation signal S2a are balanced, the power system 1 can meet the requirements of the minimum pulse-width limitation. As a result, the accuracy of the output voltage Vout is enhanced.

The operations of the control signal Sc in the negative half cycle will be described as follows.

Figure 5A:
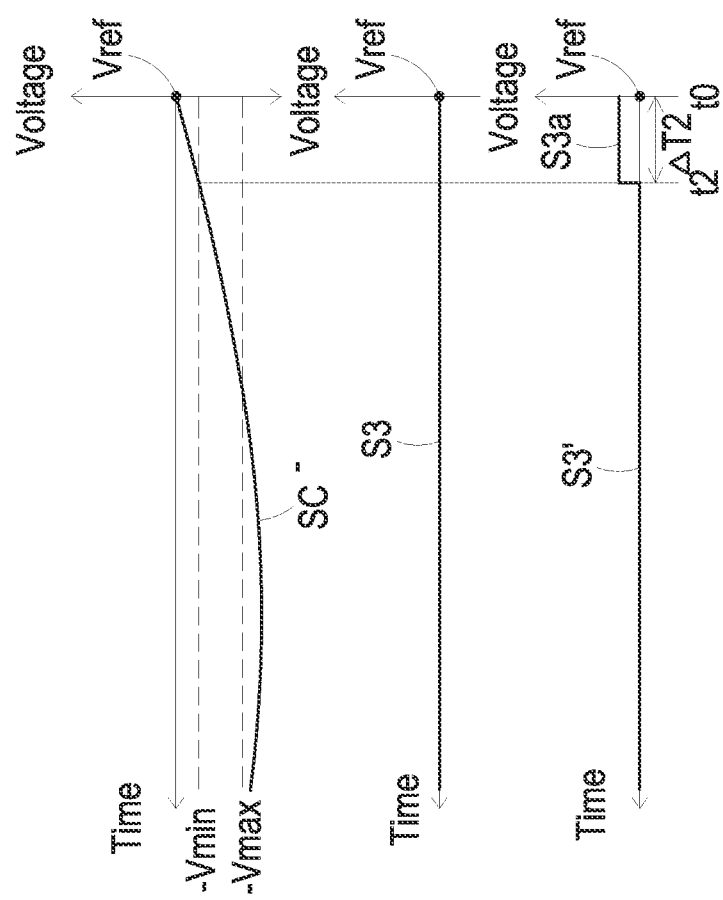
FIG. 5A is a schematic timing waveform diagram illustrating a second PWM signal S3$a$ and a third reference signal S3' generated by the pulse width modulation unit 21.
Figure 5B:
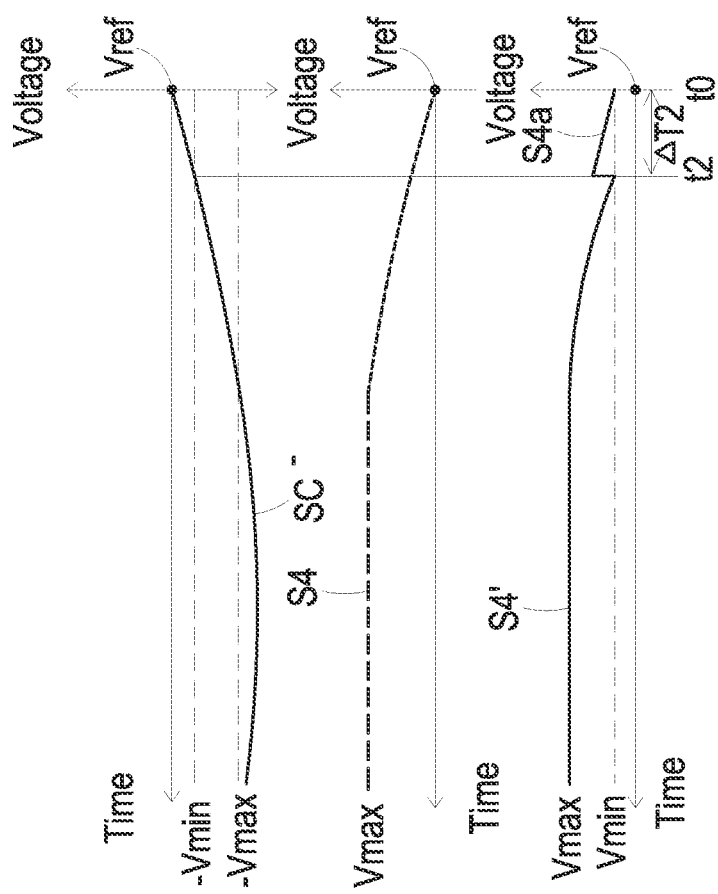
FIG. 5B is a schematic timing waveform diagram illustrating a second ramp signal S4$a$ and a fourth reference signal S4' generated by the pulse width modulation unit 21.
Figure 6A:
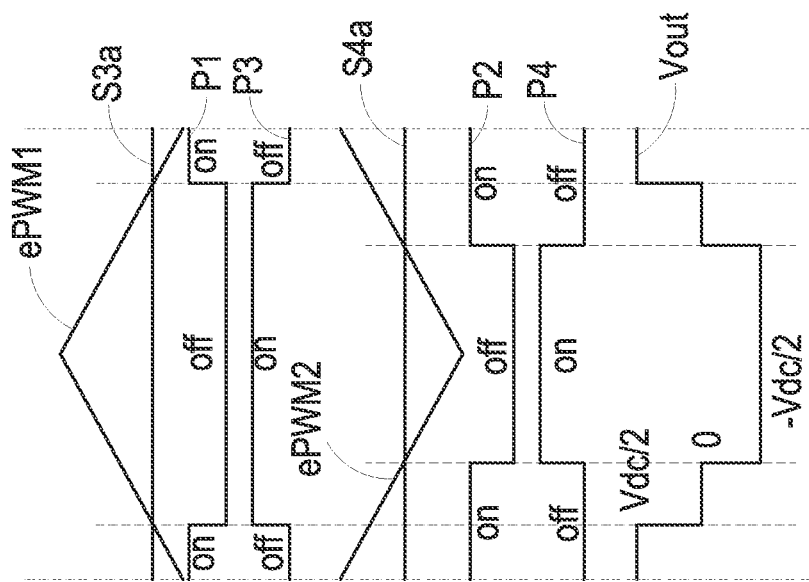
FIG. 6A is a schematic timing waveform diagram illustrating the relationship between the first triangular waveform ePWM1, the second triangular waveform ePWM2, the second PWM signal S3$a$, the second ramp signal S4$a$, the first driving signal P1, the second driving signal P2, the third driving signal P3 and the fourth driving signal P4 in a second time interval.
Figure 6B:
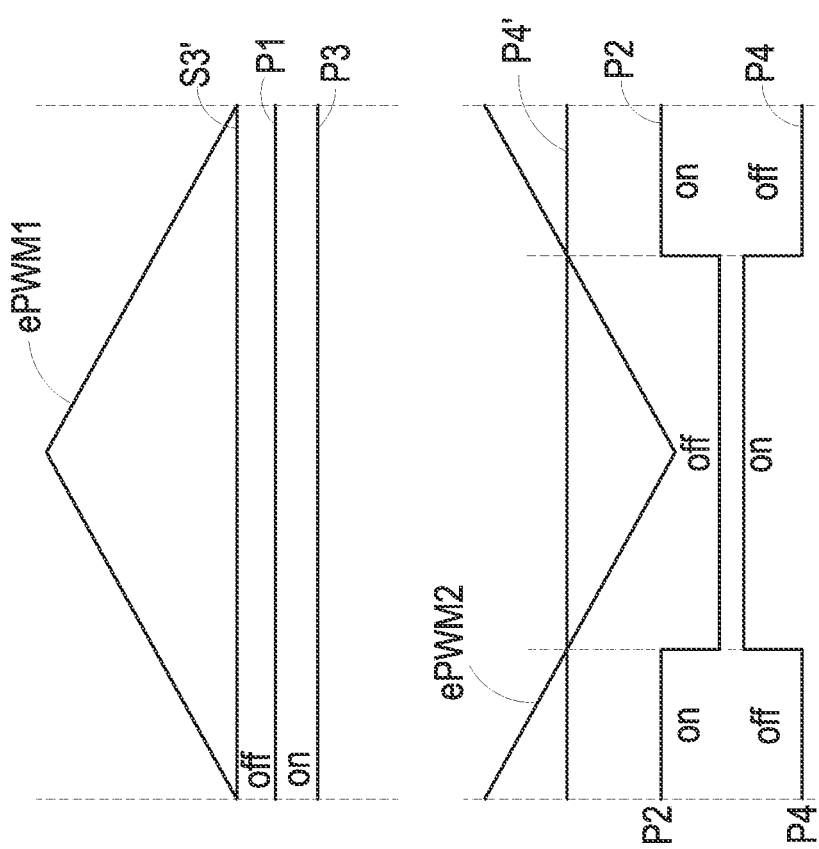
FIG. 6B is a schematic timing waveform diagram illustrating the relationship between the first triangular waveform ePWM1, the second triangular waveform ePWM2, the third reference signal S3', the fourth reference signal S4', the first driving signal P1, the second driving signal P2, the third driving signal P3 and the fourth driving signal P4 in the second time interval.

Please refer to FIGS. 1, 2, 5A, 5B, 6A and 6B. FIG. 5A is a schematic timing waveform diagram illustrating a second PWM signal S3a and a third reference signal S3' generated by the pulse width modulation unit 21. FIG. 5B is a schematic timing waveform diagram illustrating a second ramp signal S4a and a fourth reference signal S4' generated by the pulse width modulation unit 21. FIG. 6A is a schematic timing waveform diagram illustrating the relationship between the first triangular waveform ePWM1, the second triangular waveform ePWM2, the second PWM signal S3a, the second ramp signal S4a, the first driving signal P1, the second driving signal P2, the third driving signal P3 and the fourth driving signal P4 in a second time interval ΔT2. FIG. 6B is a schematic timing waveform diagram illustrating the relationship between the first triangular waveform ePWM1, the second triangular waveform ePWM2, the third reference signal S3', the fourth reference signal S4', the first driving signal P1, the second driving signal P2, the third driving signal P3 and the fourth driving signal P4 in the second time interval ΔT2.

Please refer to FIG. 5A. In some embodiments, in the negative half cycle of the control signal Sc, the pulse width modulation unit 21a clamps the negative periodic signal Sc– as the reference voltage level Vref, so that a third comparison waveform S3 is generated. The pulse width modulation unit 21a inverts the negative periodic signal Sc–, and clamps the portion of the inverted negative periodic signal Sc– that is higher than or equal to the maximum threshold voltage Vmax as the maximum threshold voltage Vmax, so that a fourth comparison waveform S4 is generated.

Then, the pulse width modulation unit 21 samples the portions of the third comparison waveform S3 and the fourth comparison waveform S4 in a second time interval ΔT2 between the critical time point t0 and a second predetermined time point t2. The minimum threshold voltage Vmin and the portion of the third comparison waveform S3 in the second time interval ΔT2 are superimposed by the pulse width modulation unit 21 to generate a second pulse width modulation signal S3a (see FIG. 5A). The minimum threshold voltage Vmin and the portion of the fourth comparison waveform S4 in the second time interval ΔT2 are superimposed by the pulse width modulation unit 21 to generate a second ramp signal S4a (see FIG. 5B).

Please refer to FIG. 6A. In the second time interval ΔT2, the first driving signal P1 and the third driving signal P3 are adjusted by the pulse width modulation unit 21 according to the result of comparing the second pulse width modulation signal S3a with the first triangular waveform ePWM1, and the second driving signal P2 and the fourth driving signal P4 are adjusted by the pulse width modulation unit 21 according to the result of comparing the second ramp signal S4a with the second triangular waveform ePWM2. The second time interval ΔT2 is a time interval in the negative half cycle of the control signal Sc corresponding to the minimum pulse-width limitation of the power system 1.

Please refer to FIG. 6A again. When the pulse width modulation unit 21 determines that the second pulse width modulation signal S3a is higher than the first triangular waveform ePWM1 in the second time interval ΔT2, the pulse width modulation unit 21 switches the first driving signal P1 to the high level state and switches the third driving signal P3 to the low level state. Consequently, the first transistor Q1 is turned on, and the third transistor Q3 is turned off. When the pulse width modulation unit 21 determines that the second ramp signal S4a is lower than the second triangular waveform ePWM2 in the second time interval ΔT2, the pulse width modulation unit 21 switches the second driving signal P2 to the high level state and switches the fourth driving signal P4 to the low level state. Consequently, the second transistor Q2 is turned on, and the fourth transistor Q4 is turned off.

In addition, when the pulse width modulation unit 21 determines that the second pulse width modulation signal S3a is lower than or equal to the first triangular waveform ePWM1 in the second time interval ΔT2, the pulse width modulation unit 21 switches the first driving signal P1 to the low level state and switches the third driving signal P3 to the high level state. Consequently, the first transistor Q1 is turned off, and the third transistor Q3 is turned on. When the pulse width modulation unit 21 determines that the second ramp signal S4a is higher than or equal to the second triangular waveform ePWM2 in the second time interval ΔT2, the pulse width modulation unit 21 switches the second driving signal P2 to the low level state and switches the fourth driving signal P4 to the high level state. Consequently, the second transistor Q2 is turned off, and the fourth transistor Q4 is turned on.

As shown in FIG. 6A, the output voltage Vout has three levels, which are 0, –Vdc/2 and Vdc/2, in the negative half cycle of the control signal Sc.

Figure 7:
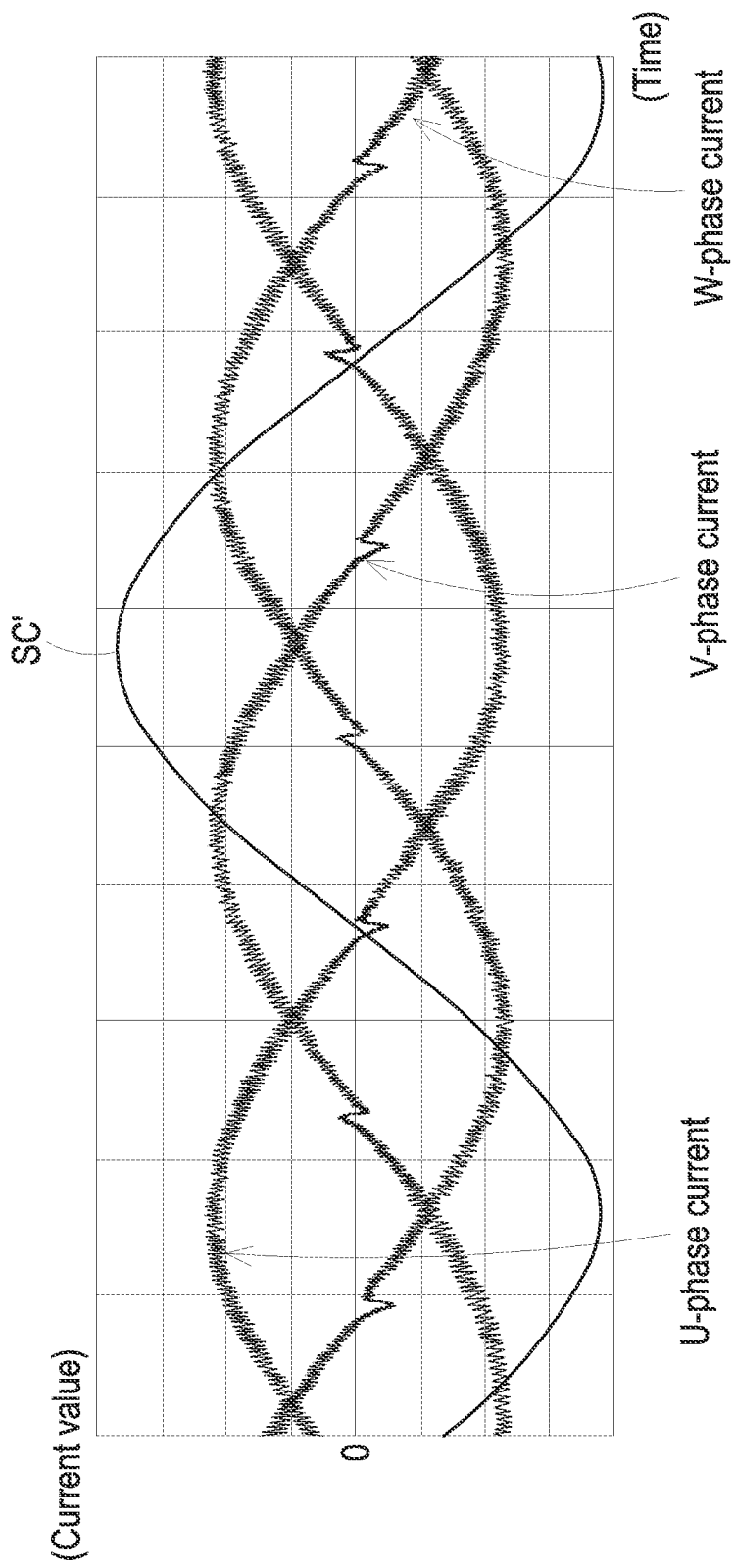
FIG. 7 is a schematic timing waveform diagram illustrating the output current from the conventional power system with the minimum pulse-width limit.
Figure 8:
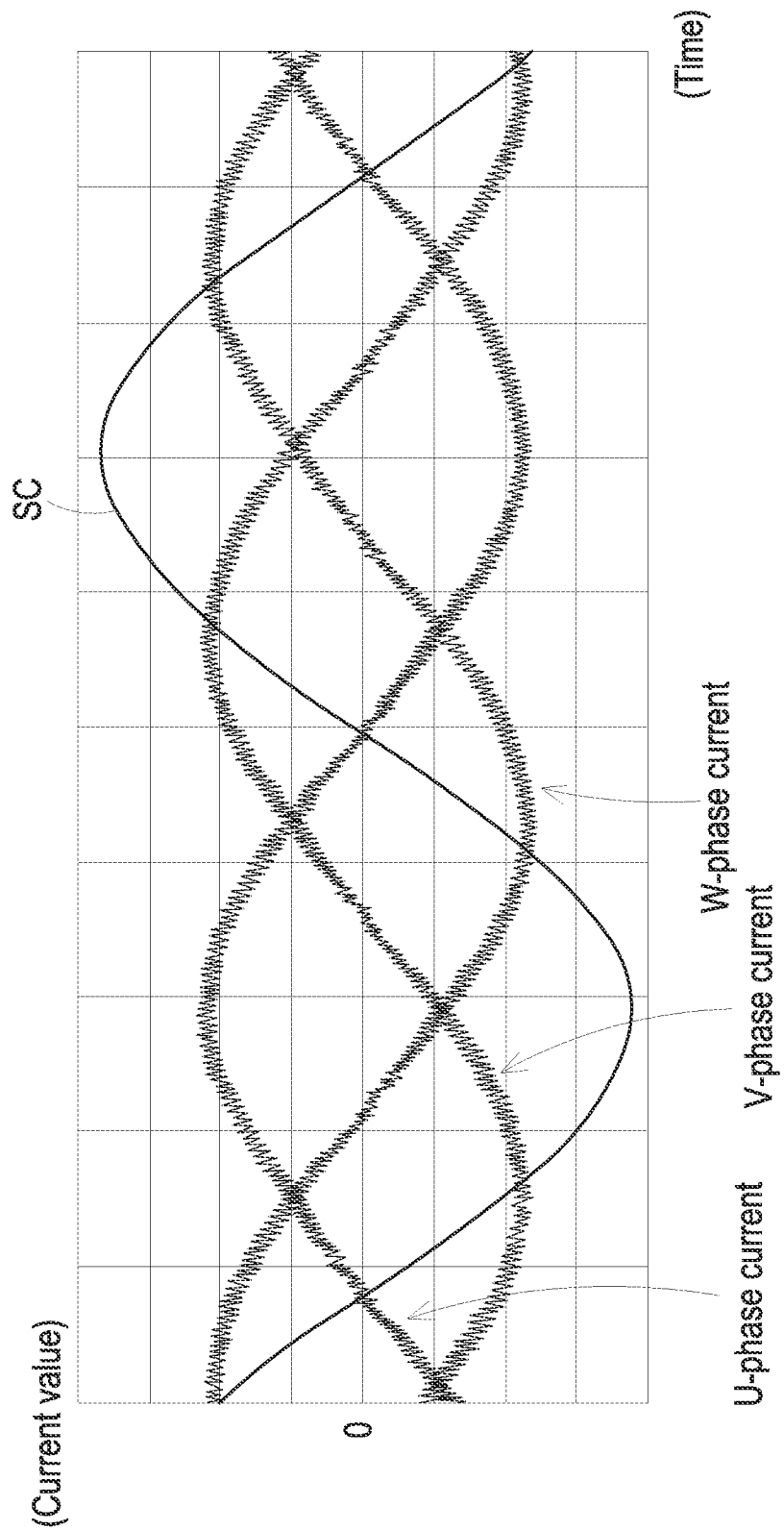
FIG. 8 is a schematic timing waveform diagram illustrating the output current from the power system of the present disclosure.

FIG. 7 is a schematic timing waveform diagram illustrating the output current from the conventional power system with the minimum pulse-width limit. FIG. 8 is a schematic timing waveform diagram illustrating the output current from the power system 1 of the present disclosure. As shown in FIG. 7, the control signal Sc' from the control unit of the conventional power system has zero-crossing distortion due to the minimum pulse-width limit. That is, the output current (including the U-phase current, the V-phase current and the W-phase current) outputted from the conventional power system is suffered from distortion. According to the present disclosure, the minimum threshold voltage Vmin is compensated to the control signal Sc in the time intervals of the positive half cycle and the negative half cycle of the control signal Sc corresponding to the minimum pulse-width limitation of the power system 1. As shown in FIG. 8, the distortion about the output current (including the U-phase current, the V-phase current and the W-phase current) outputted form the power system 1 is reduced. That is, the zero-crossing distortion due to minimum pulse-width limit is considerably reduced.

Please refer to FIG. 2, FIGS. 3A to 3B and FIG. 4B again. In some other embodiments, the pulse width modulation unit 21 samples the first comparison waveform S1 in the time period outside the first time interval ΔT1 (e.g., after the time point t1 as shown in FIG. 3A) as the first reference waveform S1', and the pulse width modulation unit 21 samples the second comparison waveform S2 in the time period outside the first time interval ΔT1 (e.g., after the time point t1 as shown in FIG. 3B) as the second reference waveform S2'.

Please refer to FIG. 4B. The first driving signal P1 and the third driving signal P3 are adjusted by the pulse width modulation unit 21 according to the result of comparing the first reference waveform S1' with the first triangular waveform ePWM1. When the pulse width modulation unit 21 determines that the first reference waveform S1' is higher than the first triangular waveform ePWM1, the pulse width modulation unit 21 switches the first driving signal P1 to the high level state and switches the third driving signal P3 to the low level state. In addition, when the pulse width modulation unit 21 determines that the first reference waveform S1' is lower than or equal to the first triangular waveform ePWM1, the pulse width modulation unit 21 switches the first driving signal P1 to the low level state and switches the third driving signal P3 to the high level state. Moreover, when the pulse width modulation unit 21 determines that the second reference waveform S2' is lower than the second triangular waveform ePWM2 consistently, the pulse width modulation unit 21 keeps the second driving signal P2 at the high level state and keeps the fourth driving signal P4 at the low level state.

Please refer to FIG. 2, FIGS. 5A to 5B and FIG. 6B again. In some other embodiments, the pulse width modulation unit 21 samples the third comparison waveform S3 in the time period outside the second time interval ΔT2 (e.g., before the time point t2 as shown in FIG. 5A) as the third reference waveform S3', and the pulse width modulation unit 21 samples the fourth comparison waveform S4 in the time period outside the second time interval ΔT2 (e.g., before the time point t2 as shown in FIG. 5B) as the fourth reference waveform S4'.

Please refer to FIG. 6B. The second driving signal P2 and the fourth driving signal P4 are adjusted by the pulse width modulation unit 21 according to the result of comparing the fourth reference waveform S4' with the second triangular waveform ePWM2. When the pulse width modulation unit 21 determines that the fourth reference waveform S4' is lower than the second triangular waveform ePWM2, the pulse width modulation unit 21 switches the second driving signal P2 to the high level state and switches the fourth driving signal P4 to the low level state. In addition, when the pulse width modulation unit 21 determines that the fourth reference waveform S4' is higher than or equal to the second triangular waveform ePWM2, the pulse width modulation unit 21 switches the second driving signal P2 to the low level state and switches the fourth driving signal P4 to the high level state. Moreover, when the pulse width modulation unit 21 determines that the third reference waveform S3' is lower than the first triangular waveform ePWM1 consistently, the pulse width modulation unit 21 keeps the first driving signal P1 at the low level state and keeps the third driving signal P3 at the high level state.

In an embodiment, the first triangular waveform ePWM1 and the second triangular waveform ePWM2 are carrier signals of the control signal Sc. The frequency of each of the first triangular waveform ePWM1 and the second triangular waveform ePWM2 is at least ten times the frequency of the control signal Sc. Since the frequency of each of the first triangular waveform ePWM1 and the second triangular waveform ePWM2 is much higher than the frequency of the control signal Sc, the waveforms of the control signal Sc as shown in FIGS. 4A, 4B, 6A and 6B are nearly linear waveforms with respect to the carrier signals.

The present disclosure further provides a pulse width modulation method for the pulse width modulation device 2 of the power system 1. In an embodiment, the flowchart of the pulse width modulation method includes the following steps.

Firstly, in a step S1, the pulse width modulation unit 21 of the pulse width modulation device 2 receives a control signal Sc from the control unit 20, wherein the control signal Sc is a periodic signal.

In a step S2, the pulse width modulation unit 21 determines a critical time point of the control signal Sc according to a reference voltage level Vref.

In a step S3, the pulse width modulation unit 21 divides the control signal Sc into a positive periodic signal Sc+ and a negative periodic signal Sc− according to the critical time point. The control signal Sc at the critical time point is close to the reference voltage level Vref within the error range.

In a step S4, the portion of the positive periodic signal Sc+ that is higher than or equal to a maximum threshold voltage Vmax is clamped as the maximum threshold voltage Vmax by the pulse width modulation unit 21, so that a first comparison waveform S1 is generated.

In a step S5, the positive periodic signal Sc+ is clamped as the reference voltage level Vref by the pulse width modulation unit 21, so that a second comparison waveform S2 is generated.

In a step S6, the pulse width modulation unit 21 samples the portions of the first comparison waveform S1 and the second comparison waveform S2 in a first time interval ΔT1 between the critical time point t0 and a first predetermined time point t1 (see FIG. 2).

In a step S7, the minimum threshold voltage Vmin and the portion of the first comparison waveform S1 in the first time interval ΔT1 are superimposed by the pulse width modulation unit 21, so that a first ramp signal S1a is generated (see FIG. 3A).

In a step S8, the minimum threshold voltage Vmin and the portion of the second comparison waveform S2 in the first time interval ΔT1 are superimposed by the pulse width modulation unit 21, so that a first pulse width modulation signal S2a is generated (see FIG. 3B).

In a step S9, the first driving signal P1 and the third driving signal P3 in the first time interval ΔT1 are adjusted by the pulse width modulation unit 21 according to the result of comparing the first ramp signal S1a with a first triangular waveform ePWM1.

In a step S10, the second driving signal P2 and the fourth driving signal P4 in the first time interval ΔT1 are adjusted by the pulse width modulation unit 21 according to the result of comparing the first pulse width modulation signal S2a with a second triangular waveform ePWM2. The phase difference between the first triangular waveform ePWM1 and the second triangular waveform ePWM2 is 180 degrees.

When the comparing result of the step S9 indicates that the pulse width modulation unit 21 determines the first ramp signal S1a is higher than the first triangular waveform ePWM1 in the first time interval ΔT1, the pulse width modulation unit 21 switches the first driving signal P1 to the high level state and switches the third driving signal P3 to the low level state. Consequently, the first transistor Q1 is turned on, and the third transistor Q3 is turned off. When the comparing result of the step S10 indicates that the pulse width modulation unit 21 determines the first pulse width modulation signal S2a is lower than the second triangular waveform ePWM2, the pulse width modulation unit 21 switches the second driving signal P2 to the high level state and switches the fourth driving signal P4 to the low level state. Consequently, the second transistor Q2 is turned on, and the fourth transistor Q4 is turned off.

Whereas, when the comparing result of the step S9 indicates that the pulse width modulation unit 21 determines the first ramp signal S1a is lower than or equal to the first triangular waveform ePWM1 in the first time interval ΔT1, the pulse width modulation unit 21 switches the first driving signal P1 to the low level state and switches the third driving signal P3 to the high level state. Consequently, the first transistor Q1 is turned off, and the third transistor Q3 is turned on. When the comparing result of the step S10 indicates that the pulse width modulation unit 21 determines the first pulse width modulation signal S2a is higher than or equal to the second triangular waveform ePWM2, the pulse width modulation unit 21 switches the second driving signal P2 to the low level state and switches the fourth driving signal P4 to the high level state. Consequently, the second transistor Q2 is turned off, and the fourth transistor Q4 is turned on.

In an embodiment, the flowchart of the pulse width modulation method further includes the following steps.

In a step S1', the negative periodic signal Sc− is clamped as the reference voltage level Vref by the pulse width modulation unit 21, so that a third comparison waveform S3 is generated.

In a step S2', the pulse width modulation unit 21 inverts the negative periodic signal Sc−, and the portion of the inverted negative periodic signal Sc− that is higher than or equal to the maximum threshold voltage Vmax is clamped as the maximum threshold voltage Vmax by the pulse width modulation unit 21, so that a fourth comparison waveform S4 is generated.

In a step S3', the pulse width modulation unit 21 samples the portions of the third comparison waveform S3 and the fourth comparison waveform S4 in a second time interval ΔT2 between the critical time point t0 and a second predetermined time point t2.

In a step S4', the minimum threshold voltage Vmin and the portion of the third comparison waveform S3 in the second time interval ΔT2 are superimposed by the pulse width modulation unit 21, so that a second pulse width modulation signal S3a is generated.

In a step S5', the minimum threshold voltage Vmin and the portion of the fourth comparison waveform S4 in the second time interval ΔT2 are superimposed by the pulse width modulation unit 21, so that a second ramp signal S4a is generated.

In a step S6', the first driving signal P1 and the third driving signal P3 in the second time interval ΔT2 are adjusted by the pulse width modulation unit 21 according to the result of comparing the second pulse width modulation signal S3a with the first triangular waveform ePWM1.

In a step S7', the second driving signal P2 and the fourth driving signal P4 in the second time interval ΔT2 are adjusted by the pulse width modulation unit 21 according to the result of comparing the second ramp signal S4a with the second triangular waveform ePWM2.

When the comparing result of the step S6' indicates that the pulse width modulation unit 21 determines the second pulse width modulation signal S3a is higher than the first triangular waveform ePWM1 in the second time interval ΔT2, the pulse width modulation unit 21 switches the first driving signal P1 to the high level state and switches the third driving signal P3 to the low level state. Consequently, the first transistor Q1 is turned on, and the third transistor Q3 is turned off. When the comparing result of the step S7' indicates that the pulse width modulation unit 21 determines second ramp signal S4a is lower than the second triangular waveform ePWM2 in the second time interval ΔT2, the pulse width modulation unit 21 switches the second driving signal P2 to the high level state and switches the fourth driving signal P4 to the low level state. Consequently, the second transistor Q2 is turned on, and the fourth transistor Q4 is turned off.

When the comparing result of the step S6' indicates that the pulse width modulation unit 21 determines the second pulse width modulation signal S3a is lower than or equal to the first triangular waveform ePWM1 in the second time interval ΔT2, the pulse width modulation unit 21 switches the first driving signal P1 to the low level state and switches the third driving signal P3 to the high level state. Consequently, the first transistor Q1 is turned off, and the third transistor Q3 is turned on. When the comparing result of the step S7' indicates that the pulse width modulation unit 21 determines the second ramp signal S4a is higher than or equal to the second triangular waveform ePWM2 in the second time interval ΔT2, the pulse width modulation unit 21 switches the second driving signal P2 to the low level state and switches the fourth driving signal P4 to the high level state. Consequently, the second transistor Q2 is turned off, and the fourth transistor Q4 is turned on.

Preferably but not exclusively, the control unit 20 is a microcontroller, and the pulse width modulation unit 30 is a pulse width modulator.

From the above descriptions, the present disclosure provides a power system and a pulse width modulation method for the power system. The minimum threshold voltage is compensated to the control signal in the time intervals of the positive half cycle and the negative half cycle of the control signal corresponding to the minimum pulse-width limitation of the power system. Consequently, the zero-crossing distortion due to minimum pulse-width limit is considerably reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power system, comprising:
   a power conversion device; and
   a pulse width modulation device outputting a first driving signal, a second driving signal, a third driving signal and a fourth driving signal to control the power conversion device, wherein the pulse width modulation device comprises:
   a control unit generating a control signal, wherein the control signal is a periodic signal; and
   a pulse width modulation unit determining a critical time point of the control signal according to a reference voltage level, and dividing the control signal into a positive periodic signal and a negative periodic signal according to the critical time point, wherein the control signal at the critical time point is close to the reference voltage level within an error range, wherein the pulse width modulation unit clamps a portion of the positive periodic signal that is higher than or equal to a maximum threshold voltage as the maximum threshold voltage so that a first comparison waveform is generated, the pulse width modulation unit clamps the positive periodic signal as the reference voltage level so that a second comparison waveform is generated, and the pulse width modulation unit samples the first comparison waveform and the second comparison waveform in a first time interval between the critical time point and a first predetermined time point, wherein a minimum threshold voltage and the first comparison waveform in the first time interval are superimposed by the pulse width modulation unit to generate a first ramp signal, wherein the minimum threshold voltage and the second comparison waveform in the first time interval are superimposed by the pulse width modulation unit to generate a first pulse width modulation signal, wherein in the first time interval, the first driving signal and the third driving signal are adjusted by the pulse width modulation unit according to a result of comparing the first ramp signal with a first triangular waveform, and the second driving signal and the fourth driving signal are adjusted by the pulse width modulation unit according to a result of comparing the first pulse width modulation signal with a second triangular waveform, wherein a phase difference between the first triangular waveform and the second triangular waveform is 180 degrees.

2. The power system according to claim 1, wherein when the pulse width modulation unit determines that the first ramp signal is higher than the first triangular waveform in the first time interval, the first driving signal is switched to a high level state and the third driving signal is switched to a low level state, wherein when the pulse width modulation unit determines that the first pulse width modulation signal is lower than the second triangular waveform in the first time interval, the second driving signal is switched to the high level state and the fourth driving signal is switched to the low level state.

3. The power system according to claim 2, wherein when the pulse width modulation unit determines that the first ramp signal is lower than or equal to the first triangular waveform in the first time interval, the first driving signal is switched to the low level state and the third driving signal is switched to the high level state, wherein when the pulse width modulation unit determines that the first pulse width modulation signal is higher than or equal to the second triangular waveform in the first time interval, the second driving signal is switched to the low level state and the fourth driving signal is switched to the high level state.

4. The power system according to claim 2, wherein the negative periodic signal is clamped as the reference voltage level by the pulse width modulation unit to generate a third comparison waveform, wherein the negative periodic signal is inverted and the portion of the inverted negative periodic signal that is higher than or equal to the maximum threshold voltage is clamped as the maximum threshold voltage by the pulse width modulation unit to generate a fourth comparison waveform.

5. The power system according to claim 4, wherein the third comparison waveform and the fourth comparison waveform in a second time interval between the critical time point and a second predetermined time point are sampled by the pulse width modulation unit, wherein the minimum threshold voltage and the third comparison waveform in the second time interval are superimposed by the pulse width modulation unit to generate a second pulse width modulation signal, wherein the minimum threshold voltage and the fourth comparison waveform in the second time interval are superimposed by the pulse width modulation unit to generate a second ramp signal, wherein the first driving signal and the third driving signal in the second time interval are adjusted by the pulse width modulation unit according to a result of comparing the second pulse width modulation signal with the first triangular waveform, and the second driving signal and the fourth driving signal in the second time interval are adjusted by the pulse width modulation unit according to a result of comparing the second ramp signal with the second triangular waveform.

6. The power system according to claim 5, wherein when the pulse width modulation unit determines that the second pulse width modulation signal is higher than the first triangular waveform in the second time interval, the pulse width modulation unit switches the first driving signal to the high level state and switches the third driving signal to the low level state, wherein when the pulse width modulation unit determines that the second ramp signal is lower than the second triangular waveform in the second time interval, the pulse width modulation unit switches the second driving signal to the high level state and switches the fourth driving signal to the low level state.

7. The power system according to claim 5, wherein when the pulse width modulation unit determines that the second pulse width modulation signal is lower than or equal to the first triangular waveform in the second time interval, the pulse width modulation unit switches the first driving signal to the low level state and switches the third driving signal to the high level state, wherein if the pulse width modulation unit determines that the second ramp signal is higher than or equal to the second triangular waveform in the second time interval, the pulse width modulation unit switches the second driving signal to the low level state and switches the fourth driving signal to the high level state.

8. The power system according to claim 2, wherein in a time period outside the first time interval, the pulse width modulation unit further samples the first comparison waveform to generate a first reference waveform, and samples the second comparison waveform to generate a second reference waveform, wherein the first driving signal and the third driving signal are adjusted by the pulse width modulation unit according to a result of comparing the first reference waveform with the first triangular waveform.

9. The power system according to claim 8, wherein when the pulse width modulation unit determines that the first reference waveform is higher than the first triangular waveform, the pulse width modulation unit switches the first driving signal to the high level state and switches the third driving signal to the low level state, wherein when the pulse width modulation unit determines that the first reference waveform is lower than or equal to the first triangular waveform, the pulse width modulation unit switches the first driving signal to the low level state and switches the third driving signal to the high level state.

10. The power system according to claim 8, wherein when the pulse width modulation unit determines that the second reference waveform is lower than the second triangular waveform consistently, the pulse width modulation unit keeps the second driving signal at the high level state and keeps the fourth driving at the low level state.

11. The power system according to claim 5, wherein in a time period outside the second time interval, the pulse width modulation unit further samples the third comparison waveform to generate a third reference waveform, and samples the fourth comparison waveform to generate a fourth reference waveform,
  wherein the second driving signal and the fourth driving signal are adjusted by the pulse width modulation unit according to a result of comparing the fourth reference waveform with the second triangular waveform.

12. The power system according to claim 11, wherein when the pulse width modulation unit determines that the fourth reference waveform is lower than the second triangular waveform, the pulse width modulation unit switches the second driving signal to the high level state, and switches the fourth driving signal to the low level state,
  wherein when the pulse width modulation unit determines the fourth reference waveform is higher than or equal to the second triangular waveform, the pulse width modulation unit switches the second driving signal to the low level state, and switches the fourth driving signal to the high level state.

13. The power system according to claim 11, wherein when the pulse width modulation unit determines that the third reference waveform is lower than the first triangular waveform consistently, the pulse width modulation unit keeps the first driving signal at the low level state, and keeps the third driving signal at the high level state.

14. The power system according to claim 1, wherein a frequency of each of the first triangular waveform and the second triangular waveform is at least ten times a frequency of the control signal.

15. A pulse width modulation method for a pulse width modulation device of a power system, the pulse width modulation device outputting a first driving signal, a second driving signal, a third driving signal and a fourth driving signal to control a power conversion device of the power system, the pulse width modulation method comprising steps of:
  receiving a control signal, wherein the control signal is a periodic signal;
  determining a critical time point of the control signal according to a reference voltage level;
  dividing the control signal into a positive periodic signal and a negative periodic signal according to the critical time point, wherein the control signal at the critical time point is close to the reference voltage level within an error range;
  clamping a portion of the positive periodic signal that is higher than or equal to a maximum threshold voltage to be the maximum threshold voltage, so as to generate a first comparison waveform;
  clamping the positive periodic signal to be the reference voltage level, so as to generate a second comparison waveform;
  sampling the first comparison waveform and the second comparison waveform in a first time interval between the critical time point and a first predetermined time point;
  superimposing a minimum threshold voltage and the first comparison waveform in the first time interval, so as to generate a first ramp signal;
  superimposing the minimum threshold voltage and the second comparison waveform in the first time interval, so as to generate a first pulse width modulation signal;
  adjusting the first driving signal and the third driving signal in the first time interval according to a result of comparing the first ramp signal with a first triangular waveform; and
  adjusting the second driving signal and the fourth driving signal in the first time interval according to a result of comparing the first pulse width modulation signal with a second triangular waveform, wherein a phase difference between the first triangular waveform and the second triangular waveform is 180 degrees.

16. The pulse width modulation method according to claim 15, wherein when the first ramp signal is higher than the first triangular waveform in the first time interval, the first driving signal is switched to a high level state, and the third driving signal is switched to a low level state,
  wherein when the first pulse width modulation signal is lower than the second triangular waveform in the first time interval, the second driving signal is switched to the high level state, and the fourth driving signal is switched to the low level state,
  wherein when the first ramp signal is lower than or equal to the first triangular waveform in the first time interval, the first driving signal is switched to the low level state, and the third driving signal is switched to the high level state,
  wherein when the first pulse width modulation signal is higher than or equal to the second triangular waveform in the first time interval, the second driving signal is switched to the low level state, and the fourth driving signal is switched to the high level state.

17. The pulse width modulation method according to claim 15, further comprising steps of:
  clamping the negative periodic signal as the reference voltage level, so that a third comparison waveform is generated;
  inverting the negative periodic signal, and clamping the portion of the inverted negative periodic signal that is higher than or equal to the maximum threshold voltage to be the maximum threshold voltage, so that a fourth comparison waveform is generated;
  sampling the third comparison waveform and the fourth comparison waveform in a second time interval between the critical time point and a second predetermined time point;
  superimposing the minimum threshold voltage and the third comparison waveform in the second time interval to generate a second pulse width modulation signal;
  superimposing the minimum threshold voltage and the fourth comparison waveform in the second time interval to generate a second ramp signal;
  adjusting the first driving signal and the third driving signal in the second time interval according to a result of comparing the second pulse width modulation signal with the first triangular waveform; and adjusting the second driving signal and the fourth driving signal in the second time interval according to a result of comparing the second ramp signal with the second triangular waveform.

18. The pulse width modulation method according to claim 17, wherein when the second pulse width modulation signal is higher than the first triangular waveform in the second time interval, the first driving signal is switched to the high level state, and the third driving signal is switched to the low level state, wherein when the second ramp signal is lower than the second triangular waveform in the second time interval, the second driving signal is switched to the high level state, and the fourth driving signal is switched to the low level state, wherein when the second pulse width modulation signal is lower than or equal to the first triangular waveform in the second time interval, the first driving signal is switched to the low level state, and the third driving signal is switched to the high level state, wherein when the second ramp signal is higher than or equal to the second triangular waveform in the second time interval, the second driving signal is switched to the low level state, and the fourth driving signal is switched to the high level state.

* * * * *